(12) United States Patent
Sims

(10) Patent No.: US 6,488,049 B2
(45) Date of Patent: Dec. 3, 2002

(54) SUPER SENSITIVE, FULL FLOW, ADJUSTABLE PRESSURE VALVE

(76) Inventor: James O. Sims, P.O. Box 1209, Decatur, AL (US) 35602

(*) Notice: Subject to any disclaimer, the term of this patent is extended or adjusted under 35 U.S.C. 154(b) by 0 days.

(21) Appl. No.: 09/758,177

(22) Filed: Jan. 12, 2001

(65) Prior Publication Data

US 2002/0092568 A1 Jul. 18, 2002

Related U.S. Application Data

(60) Provisional application No. 60/207,322, filed on May 30, 2000.

(51) Int. Cl.[7] ............................................. F16K 15/06
(52) U.S. Cl. ................... 137/543.15; 137/540; 137/469
(58) Field of Search ................................. 137/469, 540, 137/543.15

(56) References Cited

U.S. PATENT DOCUMENTS

| | | | |
|---|---|---|---|
| 1,738,403 A | | 12/1929 | Steedman |
| 2,582,527 A | * | 1/1952 | Burnett .................. 137/543.15 |
| 2,810,397 A | * | 10/1957 | Olson et al. ........... 137/540.11 |
| 3,650,294 A | | 3/1972 | Satoh |
| 3,903,923 A | * | 9/1975 | Loup et al. .................. 137/491 |
| 3,974,850 A | | 8/1976 | Pierson |
| 4,064,904 A | | 12/1977 | Tolnai |
| 4,217,934 A | | 8/1980 | Peters |
| 4,413,688 A | | 11/1983 | Seabourn |
| 4,457,334 A | | 7/1984 | Becker et al. |
| 4,515,179 A | * | 5/1985 | Edmunds et al. ........... 137/536 |
| 4,687,022 A | | 8/1987 | Iverson |
| 5,060,690 A | | 10/1991 | Sparrow |
| 5,076,328 A | | 12/1991 | Lyon |
| 5,443,092 A | | 8/1995 | Farnsworth et al. |
| 5,906,219 A | | 5/1999 | Lavery |

* cited by examiner

*Primary Examiner*—Michael Powell Buiz
*Assistant Examiner*—Ramesh Krishnamurthy
(74) *Attorney, Agent, or Firm*—Joseph H. Beumer

(57) ABSTRACT

A high volume pressure valve accurately adjustable to within 0.25 PSIG for attachment to a pipe outlet. A flanged valve body and a cap are connected by a compression spring to permit the opening of the valve when the predetermined outlet pressure setting of the valve is exceeded.

8 Claims, 2 Drawing Sheets

SUPER SENSITIVE, FULL FLOW, ADJUSTABLE PRESSURE VALVE

CROSS-REFERENCE TO RELATED APPLICATION

This application claims the benefit of U.S. Provisional Patent Application Ser. No. 60/207,322, filed May 30, 2000.

BACKGROUND OF THE INVENTION

1. Field of the Invention

The present invention relates generally to adjustable pressure valves. More specifically, the invention is a high volume pressure valve accurately adjustable to within 0.25 pounds per square inch gauge (PSIG).

2. Description of Related Art

The relevant art of interest describes various fluid pressure valve devices, but none discloses the present invention. There is a need for an extra sensitive high pressure fluid valve adjustable to within 0.25 PSIG. The relevant art will be discussed in the order of perceived relevance to the present invention.

U.S. Pat. No. 4,457,334 issued on Jul. 3, 1984, to Henry Becker et al. describes a pressure sensitive valve actuator comprising a pressure sensor having an integral atmospheric pressure reference for releasing a plunger to shut off flow through the valve. A manually operated eccentric pin and slot arrangement is provided for resetting the plunger to the open position. The valve actuator is distinguishable for its limitation to stoppage of flow, dependence on atmospheric pressure and a plunger.

U.S. Pat. No. 5,906,219 issued on May 25, 1999, to Kieron J. Lavery describes a pressure sensitive valve comprising a reverse buckling member attached to an end of a cylindrical piston blocking the outlet port at a right angle in a capped housing. The reverse buckling member is the pressure sensitive member. The valve is distinguishable for its reliance on the buckling member.

U.S. Pat. No. 5,060,690 issued on Oct. 29, 1991, to Timothy H. Sparrow describes a pre-set regulator assembly device for attaching buttons to clothing comprising the pre-setting of a minimum pressure and an adjustable higher pressure in the device. A shield member prevents blockage of a venting port while assuring continued communication between the venting port and an area of reduced pressure such as atmospheric pressure. The device is distinguishable for its application to pneumatic pressure use.

U.S. Pat. No. 5,443,092 issued on Aug. 22, 1995, to John T. Farnsworth et al. describes a fluid flow valve device for restricting fluid flow in a check valve comprising a device having a segregated piston seat from a second conduit. A piston with peripheral apertures is held in a multiple apertured seat of a housing by a rod and an external compression spring. The device is distinguishable for its apertured piston.

U.S. Pat. No. 5,076,328 issued on Dec. 31, 1991, to David L. Lyon describes a pressure relief valve assembly in an end cap for a pneumatic pipeline comprising a valve body with a conical head having a screen and a through bore holding a compression spring having a preset cracking pressure value of 35–60 PSIG held between a valve head and valve base. The relief valve is distinguishable for its limited use with a conical head and a pneumatic test plug for insertion into pneumatic pipelines.

U.S. Pat. No. 4,687,022 issued on Aug. 18, 1987, to Jacob E. Iverson describes a pressure relief valve and regulator device comprising a valve chamber having a side port for connecting to the pressure line to be monitored. The valve seat opens to an exhaust and has a diameter slightly larger than the chamber diameter. The valve incorporates a double ended piston, spring and cam, whereby the cam offsets the normal compression gradient of the spring by rotating as the piston moves in and out. The device is distinguishable for its requirement for a double-ended piston and cam structure.

U.S. Pat. No. 3,650,294 issued on Mar. 21, 1972, to Kichiro Satoh describes a pressure retaining valve device adapted to correctly retain any predetermined pressure of any fluid and serve as a safety valve which discharges the fluid to a second side for counterbalance when the fluid pressure at a first side exceeds the predetermined pressure. The valve comprises a valve casing having an inlet and an outlet for fluid, a vertically disposed axial bore having stepped portions, a shaped valve body fitted in the vertical bore, and an adjustable spring loaded cylindrical member installed beneath the casing and connected to the vertical bore. The device is distinguishable for its inlet and outlet conduit configuration being perpendicular to the axial bore and the valve body.

U.S. Pat. No. 3,974,850 issued on Aug. 17, 1976, to Karl B. Pierson describes a high volume fluid pressure relief valve designed for the top of a vent opening in a fluid storage tank comprising a valve member which is reciprocal to and from a valve seat disposed in alignment with the vent opening. Constant spring means coact with the valve member for normally retaining the valve member in a closed condition, whereby the fluid pressure force required to move the valve member remains constant throughout the travel of the valve member. A large venting capacity and an "in-breathing" capacity are provided in the valve. The valve is distinguishable for its gas venting capability.

U.S. Pat. No. 4,064,904 issued on Dec. 27, 1977, to Julius L. Tolnai describes a washer less cartridge valve for faucets comprising a hollow and highly flexible sealing member. The valve is distinguishable for being limited to the structure of a faucet.

U.S. Pat. No. 4,413,688 issued on Nov. 8, 1983, to Joe M. Seabourn describes a diverter valve for preventing blow-outs in oil wells comprising a cylindrical housing having an inclined exhaust port connected by bolts to the down pipe. The housing includes a guide shaft centered within a coil spring and attached to a gasket on top and a cup at the opposite end. The valve is distinguishable for its exhaust port, guide shaft and cup structure.

U.S. Pat. No. 4,217,934 issued on Aug. 19, 1980, to Clifford M. Peters describes a pilot valve mechanism for high or low pressure cut-off control comprising a piston responsive to pressure variations by an adjustable spring which acts through an actuator stem on a shuttle valve interposed between the actuator stem and the piston. The valve is distinguishable for its piston structure.

U.S. Pat. No. 1,738,403 issued on Dec. 3, 1929, to Edwin H. Steedman describes a valve structure for compressors comprising a hub having ribs held by a vertical bolt and including discharge valves and inlet ports is positioned above a head of a compressor cylinder with intake and discharge chambers. The valve is distinguishable for being limited to air compressors.

None of the above inventions and patents, taken either singly or in combination, is seen to describe the instant invention as claimed.

SUMMARY OF THE INVENTION

The invention is a high volume pressure valve accurately adjustable to within 0.25 pounds per square inch gauge (PSIG).

Accordingly, it is a principal object of the invention to provide a high volume pressure valve device.

It is another object of the invention to provide a high volume pressure valve having a property of being adjustable in pressure to within 0.25 PSIG.

It is a further object of the invention to provide a high volume pressure valve having a property of achieving full flow of its feed line.

Still another object of the invention is to provide a high volume pressure valve having a property of having a capturing effect on a seal retained on a grooved ring to prevent its dislodging during full flow operation of the valve.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
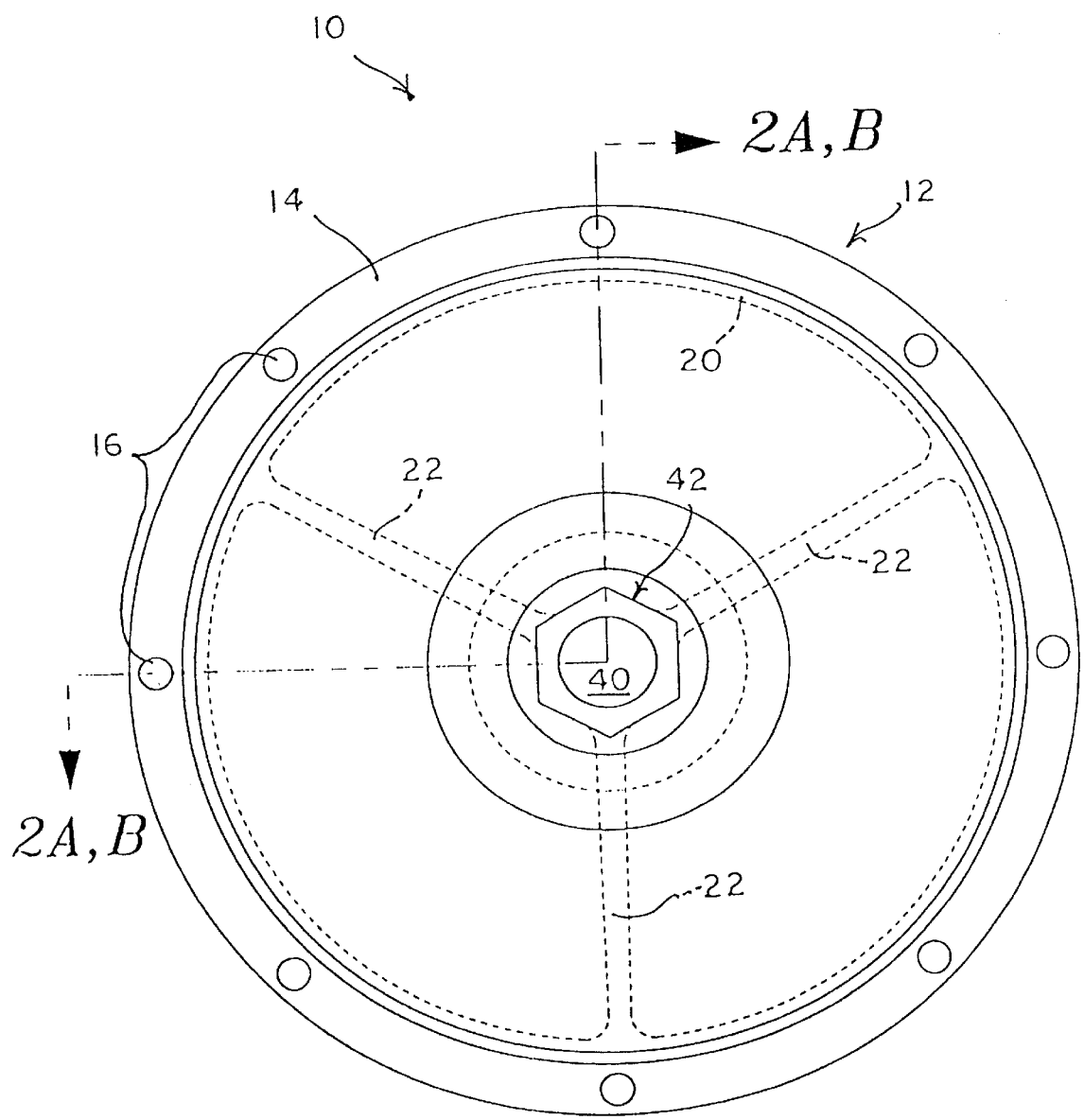
FIG. 1 is a front elevational view of the super sensitive, full flow, adjustable pressure valve according to the present invention.
Figure 2A:
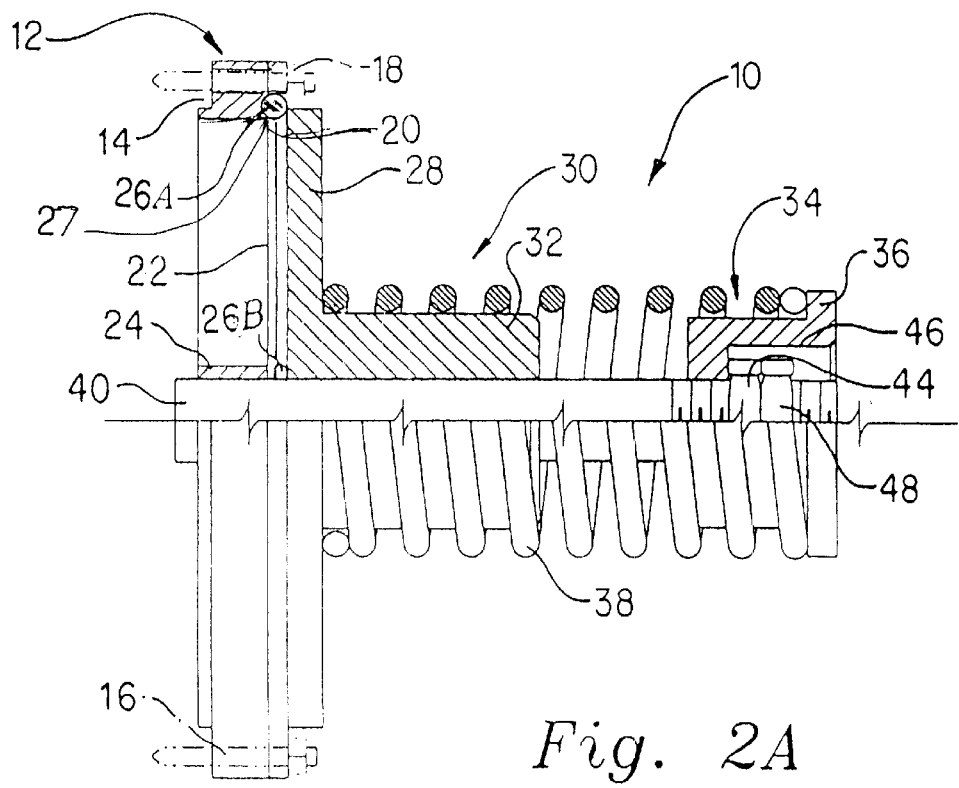
FIG. 2A is a partially sectioned side view of the super sensitive, full flow, adjustable pressure valve in a closed position when attached to a pipe (not shown) according to the present invention.
Figure 2B:
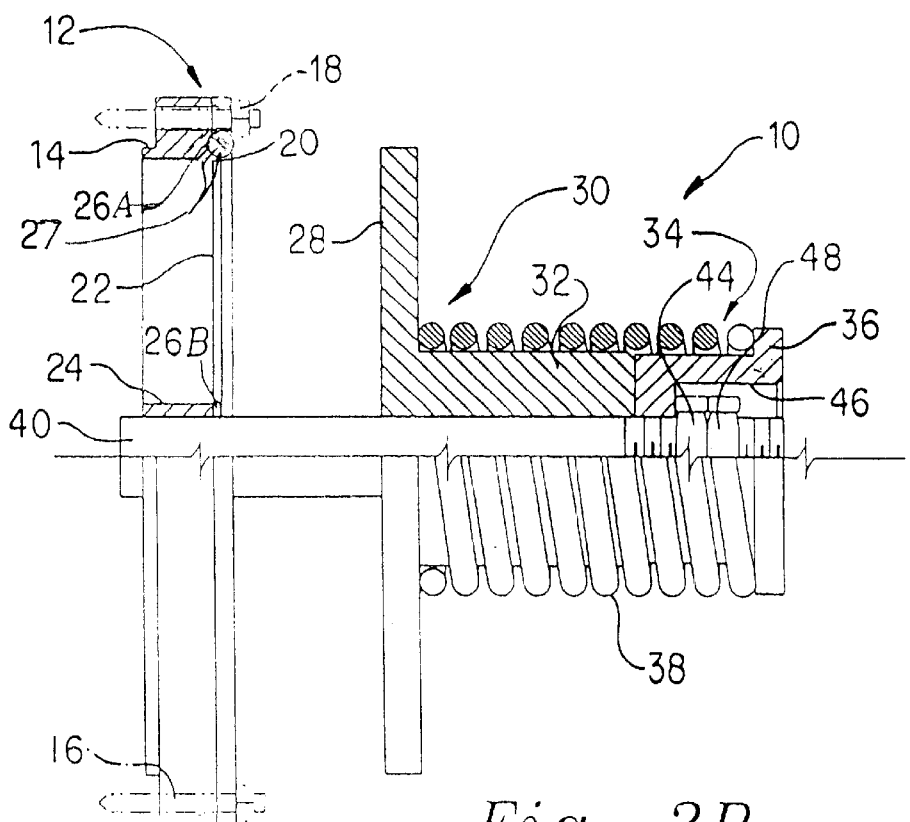
FIG. 2B is a partially sectioned view of the super sensitive, full flow, adjustable pressure valve in an open position when attached to a pipe (not shown) according to the present invention.

The present invention illustrated in FIGS. 1, 2A and 2B is directed to a high volume adjustable pressure valve 10 designed to attach to a flanged outlet pipe connection. The valve 10 comprises a metal ring base 12 with a circular flange 14 having eight spaced apertures 16 (FIG. 1) for positioning by fasteners 18 (in shadow in FIGS. 2A, 2B) of the valve 10 onto a conventional flanged outlet pipe's opening (not shown). In FIG. 1, the ring base 12 supports a reinforcement ring 20 having three webs or struts 22 (shown in shadow) joining an apertured hub 24 (hidden) having an o-ring seal 26 (FIGS. 2A, 2B)made up of inner o-ring 26A adjacent he hub and outer o-ring 26B shown captured in groove 27, which is defined in ring 20 and flange 14.The o-ring seal shown in FIGS. 2A and 2B provides sealing support for the reinforcement ring 20 and the large flanged seat element 28 of the valve body 30.

The valve 10 in FIG. 2A is illustrated in a closed condition. The open position of the valve 10 is depicted in FIG. 2B. The flanged portion 28 of the valve body 30 is connected to an apertured cylindrical body portion 32. An apertured cap 34 has a lip 36 against which the front end of a compression spring 38 is seated onto. The rear end of the spring 38 is seated on the flange 28 at the intersection with the body portion 32.

The calibration of the compression spring 38 relative to the opening fluid pressure value is determined by adjusting the bolt 40 having hexagonal head 42 (FIG. 1) which passes through the hub 24, the valve body 30, and the apertured cap 34. The adjustment is made by turning hexagonal adjustment nut 44 in axial cylindrical recess 46 in the front end of apertured cap 34 until the correct spring compression is reached, and then secured against rotation by locking nut 48. To assist in securing bolt 40 against rotation while adjusting spring pressure during calibration, hexoganol head 42 of bolt 40 may be welded to apertured hub 24 at its rear end. Consequently, when the fluid pressure exceeds the predetermined set pressure value of the valve 10, the valve will open as depicted in FIG. 2B to release the fluid out of the system.

It has been determined that this valve 10 can be calibrated to within 0.25 PSIG for releasing excessive fluid pressure in a pipeline. This minimal pressure tolerance for a high volume fluid source is considered a critical and desirable feature.

It is to be understood that the present invention is not limited to the sole embodiments described above, but encompasses any and all embodiments within the scope of the following claims.

I claim:

1. A high volume adjustable pressure valve comprising:
    a ring base having a reinforcement ring portion, a central hub, and a first circular flange around a periphery of the said reinforcement ring portion, said hub having an axially extending aperture defined therein and a plurality of struts radially connecting said hub to said ring portion;
    a cylindrical valve body with an aparture, said valve body having a seat base including a second flange and adapted for inter-fitting said reinforcement ring portion of said ring base;
    a seal positioned between said first circular flange and said hub of said base ring and said valve body, said seal comprising a first o-ring disposed adjacent to said hub in position to be contacted by an inner portion of said second flange and a second o-ring disposed between said first circular flange and said second flange, said second O-ring adapted for being captured in a groove defined in said base ring and placed in position for being contacted by an outer edge of said first flange;
    a cap having an aperture defined therein and including an external lip;

a compression spring seated at one end on said second flange and at its opposite end on said cap at said lip and an adjustment bolt inserted in order through said apertures of said ring base, said valve body and said cap, respectively.

2. The high volume adjustable pressure valve according to claim 1 wherein said ring base defines spaced apertures for connection by fasteners to an existing port in a pipeline.

3. The high volume adjustable pressure valve according to claim 1 wherein there are three of said struts.

4. The high volume adjustable pressure valve according to claim 1 wherein said bolt has a head affixed to said hub.

5. The high volume adjustable pressure valve according to claim 4 wherein said bolt head is welded to said hub.

6. The high volume adjustable pressure valve according to claim 4 wherein said bolt has a threaded end extending through the aperture of said cap, and adjustment nut securing said bolt in a place determined by compression of said spring; whereby said pressure valve is calibrated.

7. The high volume adjustable pressure valve according to claim 6 wherein said cap defines a cylindrical recess for receiving said threaded end and said adjustment nut.

8. The high volume adjustable pressure valve according to claim 7 further comprising a locking nut adjacent said adjustment nut for locking said adjustment nut in place.

* * * * *